United States Patent
Dettling et al.

(10) Patent No.: US 6,645,335 B1
(45) Date of Patent: Nov. 11, 2003

(54) SURFACE TREATMENT METHOD IN PARTICULAR FOR IMPROVING BARRIER AND PRINTING PROPERTIES OF WEBS

(75) Inventors: Bernhard Dettling, Chatenois (FR); Heikki Ahonen, Ritvala (FI)

(73) Assignee: Idi-Head Oy, Ritvala (FI)

( * ) Notice: Subject to any disclaimer, the term of this patent is extended or adjusted under 35 U.S.C. 154(b) by 0 days.

(21) Appl. No.: 09/600,603

(22) PCT Filed: Jan. 19, 1999

(86) PCT No.: PCT/FI99/00032

§ 371 (c)(1),
(2), (4) Date: Jan. 23, 2001

(87) PCT Pub. No.: WO99/36621

PCT Pub. Date: Jul. 22, 1999

(30) Foreign Application Priority Data

Jan. 19, 1998 (FI) .................................................. 980106

(51) Int. Cl.[7] .......................... B32B 31/00; B32B 31/20; B32B 29/06; B05D 3/12; D21H 23/52
(52) U.S. Cl. ................... 156/232; 156/230; 156/231; 156/241; 156/247; 156/289; 427/148; 427/261; 427/361; 427/362; 427/391; 428/195; 428/211; 428/331; 428/342; 428/537.5; 428/914
(58) Field of Search ........................... 156/230, 232, 156/238, 241, 242, 246, 231, 272.2, 289; 127/261, 361, 362, 364, 391, 146, 147, 148; 428/321, 207, 195, 211, 342, 537.5, 914

(56) References Cited

U.S. PATENT DOCUMENTS 4,770,934 A  9/1988 Yamasaki et al. ............ 428/331
5,647,935 A * 7/1997 Hoshino et al. ............. 156/231

FOREIGN PATENT DOCUMENTS

| EP | 0 478 525 | | 4/1992 | |
|----|-----------|---|--------|---|
| EP | 631013 A1 | * | 6/1994 | .......... D21H/19/38 |
| EP | 0 778 371 | | 6/1997 | |
| JP | 08-164668 | * | 6/1996 | ............ B41M/5/00 |
| WO | 97/20691 | | 6/1997 | |

OTHER PUBLICATIONS

WPI, Derwent, Accession No. 97–230695, OJI Paper Co, "Preparation of Recording Sheet for Ink–Jet by Moulding Composition Containing Pigment and Electron Beam Curable Resin and Curing with Electron Beam Gives Sheet with Improved Glass".

* cited by examiner

Primary Examiner—J. A. Lorengo
(74) Attorney, Agent, or Firm—Smith-Hill and Bedell

(57) ABSTRACT

The present invention concerns a process for coating a web by applying a coating layer comprising pigment particles to the surface of the web. According to the invention, the coating layer is contacted at a preselected stage with a smooth surface, the coating layer is at least partially dried while being contacted with said surface to provide a smooth outer surface of the layer with densely packed particles, and the coating layer is separated from the smooth surface. The smooth surface of the web provided by the invention is ideal for printing or for secondary coating with polymers. Paper and board products according to the invention are easily reclaimed and can be treated in a normal pulper, because they do not contain any metal foils or polymer films.

25 Claims, 3 Drawing Sheets

SURFACE TREATMENT METHOD IN PARTICULAR FOR IMPROVING BARRIER AND PRINTING PROPERTIES OF WEBS

BACKGROUND OF THE INVENTION

1. Field of the Invention

The present invention relates to the treatment webs including films, foils and similar sheet-formed objects. In particular, the present invention concerns a novel method for improving the barrier and printing properties of industrial webs such as papers, boards and polymer films.

2. Description of Related Art

The packaging industry has developed many kinds of functional surface treatments and coatings for packaging materials in order to improve the appearance and printing properties of the products. A further important aim has been to achieve barrier properties which prevent moisture, grease, oxygen and aroma compounds from penetrating into or out from the product packed in the packaging material and, thus, for example for protecting the foodstuff from deterioration caused by contact with oxygen and moisture.

Traditionally, the best known barrier structures comprise metal films, such as aluminium foils, laminated on papers, boards or polymer films. Nowadays, the aluminum foils are to an increasing extent being replaced by various polymer films, which have good barrier properties, but which are degradable in nature. Since no single polymer can provide the same resistance to gas and water penetration as aluminium, the polymer-based laminates typically comprise multilayered polymer structures. These laminates are rather expensive and a further problem related with the prior art is formed by the difficulties with pulping and recycling polymer coated papers and boards.

Various processes for coating paper with coating compositions that are pressed against smooth surfaces to provide an even surface of the coating are known in the art. Reference is made to EP-A 631 013. EP-A 778 71. WO 97/20691, FI-B 90366. EP-A 619 178, and U.S. Pat. No. 5,451,456, the contents of which is herewith incorporated by reference.

As an alternative to the above-mentioned approaches using integral films which are attached to the desired substrate, a newly developed barrier concept comprises plasma coating of polyester films with particulate $SiO_2$. Also chemical plasma deposits for $SiO_2$ are used. The typical coating thickness is about 150–500 A. For water vapour, reductions in the transmission rates of up to 99.94% have been achieved. However, this new technology is expensive and suitable for large production scale only based on high investment costs. Furthermore, it should be pointed out that vacuum and/or plasma or electron beam coated films are difficult to print on and special printing inks are needed for affixing ink particles or colours on the surface.

SUMMARY OF THE INVENTION

It is an object of the present invention to eliminate the disadvantages of the known methods and to provide a novel method of functionally modifying the surface properties of paper, board and polymer materials by providing them with a layer having increased smoothness and improved resistance to penetration of gases and liquids.

It is another object of the invention to provide articles of web materials having improved functional surface properties.

These and other objects, together with the advantages thereof over known processes, which shall become apparent from specification which follows, are accomplished by the invention as hereinafter described and claimed.

The present invention is based on the concept of forming the surface layer from coating pigments which are compacted so as to provide a dense packing on the web. Such a layer can be achieved by forming an aqueous pigment slurry into a layer and contacting said layer with a smooth, preferably impermeable surface while simultaneously drying the layer. Further, it is preferred to have a minimum Zeta potential of the pigments in the dried layer.

As a result of the invention, a web with a coating layer is provided, said layer comprising densely packed particles forming a smooth surface having a roughness of a maximum 1–3 $\mu$m and having a permeability for water vapour of less than 5 $g/m^2/day$.

By means of the invention considerable advantages are achieved. In particular, the invention provides a layer which has excellent barrier properties against water and oxygen. These layers can be combined with various paper and board products as well as with polymer films. The paper and board products are easily reclaimed and can be treated in a normal pulper, because they do not contain any metal foils or polymer films.

The dense particle packing formed against a very smooth steel or other metal belt has a very smooth surface. This smooth surface is ideal for printing or for secondary coating with polymers. The surface can also be made from polymeric materials and coated or surface treated so that the separation of coating particles will occur from the surface.

The use of a glue for transferring the coating layer makes it possible separately to cast the coating layer on a smooth surface and then reliably attaching it to the web surface. On the other hand, when a water-soluble polymer as a tie layer or a glue between the fibrous web and the surface coating makes it possible to separate or to peel off the coating from the web during treatment in a pulper, which improves recycling of the fibrous matter of the web.

DETAILED DESCRIPTION OF THE INVENTION

Figure 1:
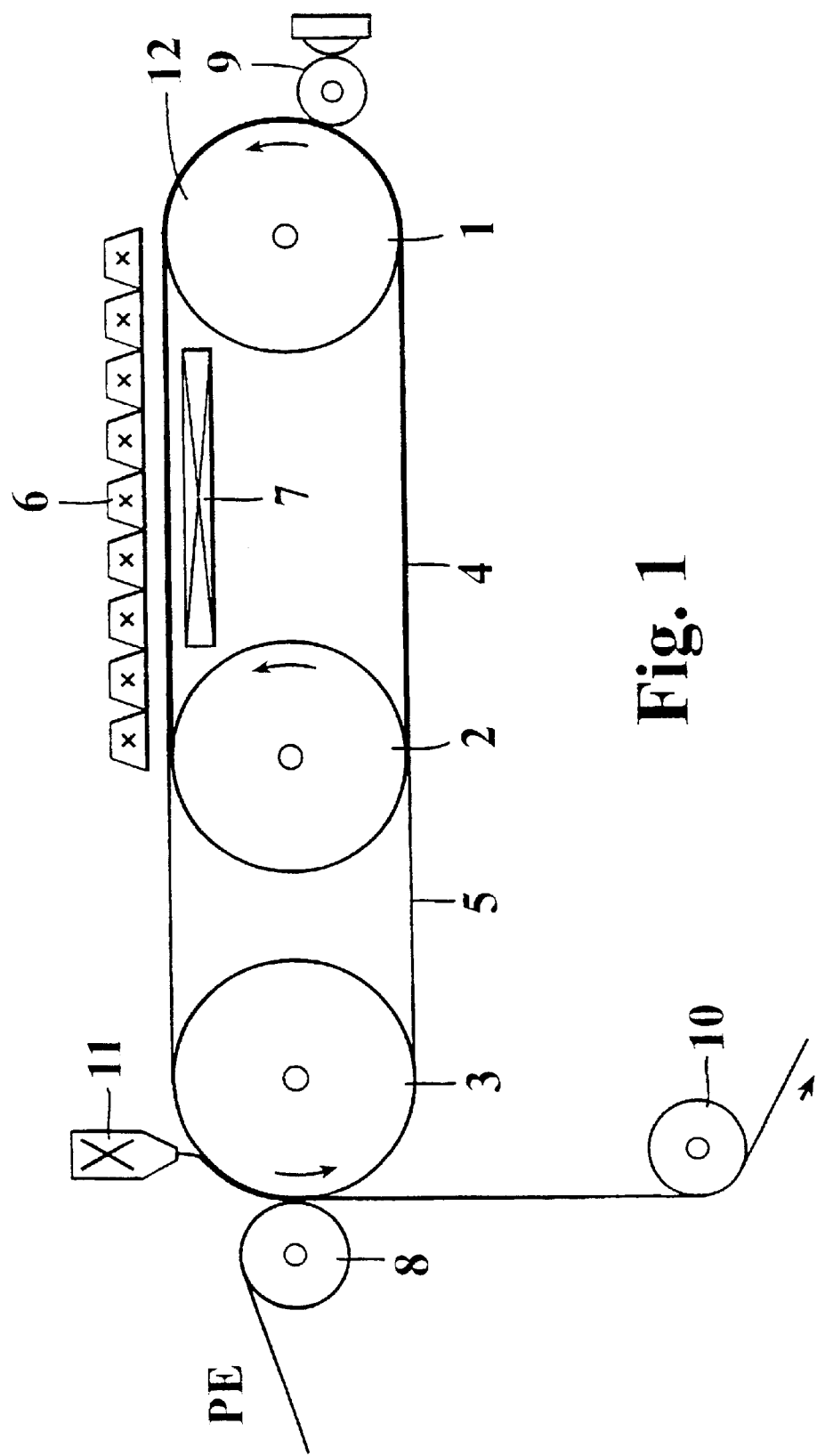
FIG. 1 is a diagrammatic representation of a first embodiment of the invention operable for coating of polymer films using a combination of a polymeric belt and a steel belt.

Next, the invention will be examined more closely with the aid of a detailed description and a number of working examples.

Within the scope of the present invention, the term "web" covers any web or continuous sheet-formed layer of a given thickness essentially formed by fibers or fibrils or by a uniaxially or biaxially stretched film. The web is in particular made from cellulosic or lignocellulosic fibers or fibrils or from a polymer film.

The terms "cellulosic" and "lignocellulosic" are used to designate materials derived from cellulose and lignocellulosic materials, respectively. In particular "cellulosic" refers to materials obtainable from chemical pulping of wood and other plant raw material. Thus, a web containing "cellulosic fibres" is made for example from kraft, sulphite or organosoly pulp. "Lignocellulosic" refers to material obtainable from wood and other plant raw material by mechanical defibering, for example by an industrial refining process, such as refiner mechanical pulping (RMP), pressurized refiner mechanical pulping (PRMP), thermomechanical pulping (TMP), groundwood (GW) or pressurized groundwood (PGW). or chemithermo-mechanical pulping (CTMP) or any other method for manufacturing a fibrous material which can be formed into a web and coated.

The present invention can be employed for coating any desired paper or board or polymer industrial web or sheet-formed product. As a practical matter, the term "paper" or "paper web" is herein used to designate both "paper" and "paperboard" and "paper web" and "paperboard web", respectively. The terms "paper" and "paperboard" refer to sheet-formed products containing cellulosic or lignocellulosic fibres. "Paperboard" is synonymous with "cardboard" or simply "board". The grammage of the paper or board can vary within broad ranges from about 30 to about 500 g/m². The polymer films can be formed by any suitable thermoplastic or thermosetting film. Thermoplastic films made from polyolefins such as polyethylene, polypropylene and copolymers of ethylene and propylene, and polyesters, such as poly(ethylene terephthalate), PET, and poly(ethylene naphthenate), PEN, are preferred.

In addition to essentially pure cellulosic webs and polymeric films and foils, the invention is applicable also to webs made up of polymer fibers and fibrils and to webs comprising combinations of cellulosic or lignocellulosic fibers and polymeric films (melted on the fibrous web, for instance) or polymeric fibers (e.g. products having high tensile ratios in wet condition). In the combined cellulosic/polymeric web embodiments, the weight ratio of the polymeric fibers or films to the cellulosic fibers can be 1 to 99%, preferably about 5 to 95%.

The terms "fines", "fibrils" and "fibres" denote finely divided material having a cross-sectional diametre of less than about 10 $\mu$m, typically in the range of 0.001 to 2 $\mu$m and the "fibrils" and "fibres" are materials having a length to cross-section diameter ratio of more than about 6.

The "roughness/smoothness" of the smooth surface used for forming the dense packing is generally given as "microns" ($\mu$m). The roughness can be measured by, for example, laser-based devices. The roughness of the smooth surface is typically on the order of 0.001 to 10 $\mu$m, preferably about 0.1 to 1 $\mu$m.

The "roughness" of the surface treated web is also given as "microns" ($\mu$m). The print-surf surface roughness at 1000 kPa can be measured according to, for example, ISO 8791-4:1992 (E).

It is known in the art that papers as well as polymer films coated with pigments or other similarly behaving materials will exhibit, in addition to improved printability, also somewhat better barrier properties than the uncoated substrate. The pigment coating is normally applied to a substrate comprising paper, board or polymer using doctor blade or roller coating in the form of a coating colour (coating composition) containing suitable binding agents. The binding agents comprise polymers, either water-soluble or polymers dispersed in water, with droplet sizes in the range of 0.15 to 0.18 microns. These numerical values apply to styrene butadiene latex as well as to acrylate and PVAc latexes. The viscosity of latex particles as separate particles is very high. It can be assumed that the latex binders behave like solid particles which will adhere to each other when the surrounding water disappears by evaporation. The latex film will also at hot conditions form an almost continuous film with some pores only. The inorganic coating particles are kept inside the film and polymer mass. Typically, the amount of the adhesive (binding) polymer is ⅕ to ¹⁄₁₃ of the amount of pigment for keeping the pigment on the paper web or plastic web. This means that the latex can and will finally form an even film after water evaporation and coalescencing. As a result, the inorganic pigment particles are separated from each other a distance amounting to, on an average, at least about 0.1 micron.

Although there is some improvement of the barrier properties of a conventionally coated article, they are still not satisfactory as regards the use of the articles for, e.g., food stuff containers. Furthermore, the smoothness of a coated paper or board is not satisfactory for all printing purposes.

The present invention aims at achieving a much more dense packing of the particles than normally obtainable by conventional coating.

The present invention is based on the finding that the mineral or metal pigment particles of a coating composition or slurry will gather together when the carrier solvent (such as water) is removed. When the particles come close enough to each other, the van der Waals forces will keep them together with very large forces. Thus, a dense packing of the particles can be formed. Different minerals and metal pigments have different conditions at which the van der Waals forces will reach a minimum. The variables include pH and concentrations of dissolved ions. For forming a dense packing, untreated $SiO_2$ particles have an optimum pH of about 2.4 and $TiO_2$ particles about 5.8 and $CaCO_3$ particles about 8.6 and $Al_2O_3$ particles about 8.9. At these pH values, the Zeta-potential will be small or zero. Thus, at a water content of less than 50%, the pH of the aqueous phase should be within the range of±10% of the value which gives the lowest Zeta potential to the slurry.

Assuming that the amount of coating on the paper is 14 g/m², as normally, and providing that the amount of the filler is 11.2 g/m² and polymer binder 2.8 g/m² and the size of the spherical pigments about 4.3 microns and if particles are silica ($SiO_2$), this coating gives already some reduction of water vapour transmission (WWTR) on board amounting to, typically, about 20.9 $H_2O/(m^2×24$ h). The initial transmission can be as high as 2000–3000 g/m².

The packaging density of spheres related to the cubic is 0.74. With a particle size of a typical mineral pigment of 50 nm=0.05 micrometer, we have theoretically 4.3/(0.05×(1/SQ2))=121 layers, where 1/SQ2 comes from the ball skullcap which are inside of the balls outer surface tangent line. In this example, the free space for the molecule to diffuse through the barrier pigment layers is for every layer 0.19 parts from the free area and at 121 layer 0.19 Exp (121)=5.3 exp (−88). If the particles have, for instance, a diameter of 1 microns, the free area amounts to 0.19 Exp(5)=0.025%. The free path of diffusion between the particles in ideal packing is (P11/2) Exp 2=2.47 time the layer thickness. Ideally, the pore size will be approximately with 50 nm particles about 40% maximum from particle size=20 nm, where restricted diffusion also known as Knudsen diffusion will take place. The external driving force will, as a result, not affect the diffusion process almost at all. In practice, this means that the lowest permeability is achieved when the pore size is always less that 50 nm, even the total free area is the same or higher than with pore sizes in excess of 50 nm.

From this example it can be seen that, the smaller the particles are, the better they can be ideally packed to increase the barrier properties. When the pore size is <2 nm, diffusion will occur as surface diffusion, where the penetrant has to diffuse on the surface and not on the free gas-phase flow. Diffusion by surface diffusion is comparable to creeping along a surface rather than running on it.

Oxygen is one of the principal compounds that is to be excluded from a package containing, e.g., food stuffs. Oxygen molecules collide against each other and the walls of container and at normal temperature the normal free path for oxygen is about 700 nm. The longest free path with a 50 nm particle packing is only about 70 nm. Theoretically, oxygen can diffuse through this kind of packaging only at relative level of (70/700) exp 2=0.01. Rather than by diffusion, oxygen transfer trough this kind of layer will therefore take place by the oxygen molecules dissolving in the medium (in accordance with Henry's law) and diffusing through the solids to the other side. However, the solubility of $O_2$ is extremely low in solids like $SiO_2$.

The above example shows that when small 50 nm particles are bound together with an emulsion, in which the droplet size is 0.15 micrometer, the particles are spaced apart by a distance corresponding to about 2 to 3 times the diameter. Alternatively, the particles will cover the polymer dispersion droplets surface. Said example in combination with the above calculation shows that small particles do not form a good barrier against diffusion if they are bound to each other with larger sized emulsion polymer materials. On the other hand the above calculation shows that ideally small particles form a much better barrier than a corresponding layer of the same thickness or weight made from particles having a larger size.

The small particles packed ideally to a dense packing will give rise to improved barrier properties as well as enlarged specific surface. Especially when this enlarged specific surface forms hydrogen bonds similarly to $SiO_2$, the free surface will be filled with $O_2$ and $H_2O$ molecules and this will restrict newcomer from travelling out from the packing layer, because the surface is already saturated with these molecules. This also explains why, for instance, gelatine has a high barrier properties against oxygen; the structure is namely saturated with similar materials like —OH groups.

The present invention is based on these findings and it provides a method how to obtain the desired dense packing between the particles. According to the present invention, mineral particles are cast as a slurry against a very smooth surface or they are contacted with a surface after casting on a web. When the coating slurry or mixture contacts with the smooth surface it is simultaneously subjected to drying in order to achieve almost complete drying of the layer. It is further preferred to vibrate the layer during drying in order to pack the pigments more tightly and to remove water from the layer. In particular such an action is produced by belt or roll vibration and the vibration is transversally directed to the movement of the belt or roll. The amplitude of the vibration depends on the size of the particles of the coating layer; the smaller the particles the smaller the amplitude. Piezocrystal vibration drivers can be used for achieving small amplitude vibrations. Vibration is preferably employed during the initial stages of the treatment.

During the drying process the particles are packed tightly against each other and theoretically the densest packing will follow if no binding polymer is used or if the binding material form away to the voids of the particles at the step during which the dense packaging is formed flow away to the voids of particles. On an average the free volume between the particles of the slurry will decrease by at least 20%, preferably at least 30% and in particular up to at least 60% or more, as a result of the present invention.

The invention can be carried out in two slightly different ways, i.e. either by first casting the coating layer on a smooth surface and then separate it from the smooth surface after drying and combining it with the web which is to be coated for example by using a glue or tie layer, or by first applying the layer to the surface of a web, as in conventional coating, and then pressing the wet layer against a smooth surface and drying it. In the latter case. evaporation is effected through the coating and the supporting web to the other side.

Polymers are preferably used for transferring a completely dried mineral coating layer onto a web with adhesive forces. These polymers exhibiting adhesive forces can comprise a water-soluble polymeric agents such as poly(vinyl alcohol), poly(ethylene imide), CMC or poly(acryl amide) or any similar polymer which can be used for gluing the coating layer to the web. The amount by weight of the gluing polymer is typically about $\frac{1}{5}$ to $\frac{1}{13}$ of the amount of pigment.

The invention also comprises various embodiments particularly designed for coating of polymer webs. Thus, a fine particles layer can be dried and compacted and the applied onto a polymer film, which is heated so much that the coating layer will partially or totally melt on the surface and partially also into the surface. Alternatively a polymer film or foil can be applied onto the surface of the dried particle layer dried against the smooth surface. The application of the polymer film can be carried out by extruding a film on the particle layer, allowing the film to cool, whereinafter it will pick-up the mineral particle layer, which then forms the surface layer of said film. The binding agent of the pigment coating layers (cf. in more detail below) can be cross-linked during the final stage of water evaporation or after that by chemical means using ultraviolet (UV) or by electron beam (EB) radiation means if suitable polymers and initiators are used. As explained above, also polymer films can be coated with the separated compacted coating layer by using tie layers such as thermoplastic polymer films The separation of the coating layer from the smooth surface can be achieved for instance by speed belt cooling from the other side or by belt coating materials, such as fluorinated polymers which do not stick to the mineral-polymer material. The belt can also be waxed and the wax will split between the mineral layer and the belts metal surface. In many cases the separation from the carrier belt will be achieved already by sufficient drying of the coating pigment layer.

According to a preferred embodiment, the web can be pretreated with cationic polymers which at least partially dried and on which the pigment layer can be cast. The cationic polymer improves the cohesion of the pigment layer and facilitates complete separation of the layer from the smooth surface. According to another preferred embodiment, small amounts of organic silicon compounds, for example silicon alkoxide compounds, are added to the pigment layer which is to be attached to the web. These compounds achieve a mat surface and promote complete separation from the smooth surface.

The smooth surface can be formed by a polished steel or other metal belt or roll or a smooth polymer belt made from, e.g. a polyester such as poly(ethylene terephthalate) (PET). On such a material or in contact therewith, the drying of the coating can be made much more completely than on a paper web only, because higher temperatures can be used. Also the dense packaging is made much more completely on a hotter surface. When water between the solid pigment particles is evaporated, it drives air completely away. During the last stage of the evaporation the temperature will decrease and the last drops of water start to condensate again. This will affect external force to collapse the packing even dense and help van der Waals forces to do the rest.

Generally, it is required that the smooth surface against which the coating layer is pressed and dried be smoother than the carrier web of the coating. As mentioned above, a roughness of about 0.1 to 1 μm is normally acceptable. The drying takes place at an increased temperature amounting to at least 110° C., preferably at 120 to 300° C., in particular at about 180 to 250° C., in order to evaporate the water and/or solvent of the coating slurry. The smaller the pigments, the higher temperatures should be used for drying.

In practice, the formation of the dense particle packing can be accomplished in several ways. Some of the preferred embodiments are depicted in the attached drawings.

A polymer web, such as a polyethylene film, can be coated with the apparatus shown in FIG. 1. The apparatus comprises in combination three rolls or reels 1, 2 and 3, with central axes which are arranged in parallel alignment. Two of the reels, 1, 2, support a steel belt 4 which in its turn supports a poly(ethylene terephthalate) belt 5 which runs about all three reels. Above the steel belt 4 and the PET belt there are arranged heating means such as IR radiators 6 for heating the coating layer on the PET belt. Similar heating means 7 can also be arranged on the opposite side of the belts, under the steel belt 4, as shown in FIG. 1. The third roll 3 is a cooling reel for cooling the coating. Placed adjacent to the cooling reel 3, a calender back reel 8 forms a roll nip with the cooling reel 3. The calender back roll supports a web of a polymeric film which is to be coated and provides contact with the coating layer on the cooling reel 3. The apparatus also comprises an application means, such as a press roll 9 which forms a nip against the first 1 of the steel belt supporting rolls.

An extrusion nozzle 11 for extruding a thermoplastic polymer or a polymer blend on the coating layer can further be provided.

According to the embodiment shown in FIG. 1, a particle layer 12 is cast on the PET belt with the press roll 9. The layer is heated and dried with heating means 6, 7. After drying the layer is separated from the PET belt 5 e.g. by melt-extruding a blend of polyethylene and a ethylene vinyl alcohol copolymer on the coating as a tie layer for bonding the coating to the polyethylene film fed into the nip between the back roll 8 and the cooling reel 3.

Figure 2:
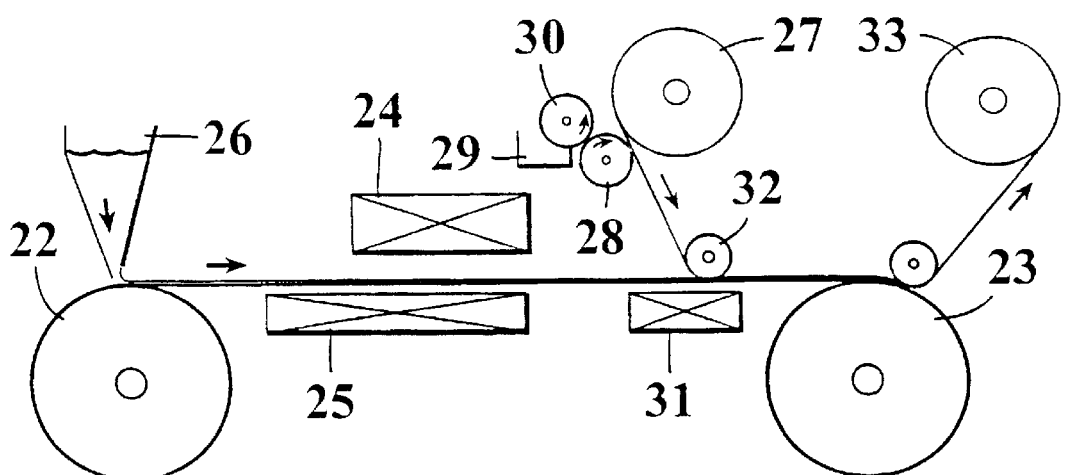
FIG. 2 is a diagrammatic representation of a second embodiment of the invention operable for coating of paper and board webs in which a glue layer or polymeric gluing agent is used for adhering the coating to the web.
Figure 3:
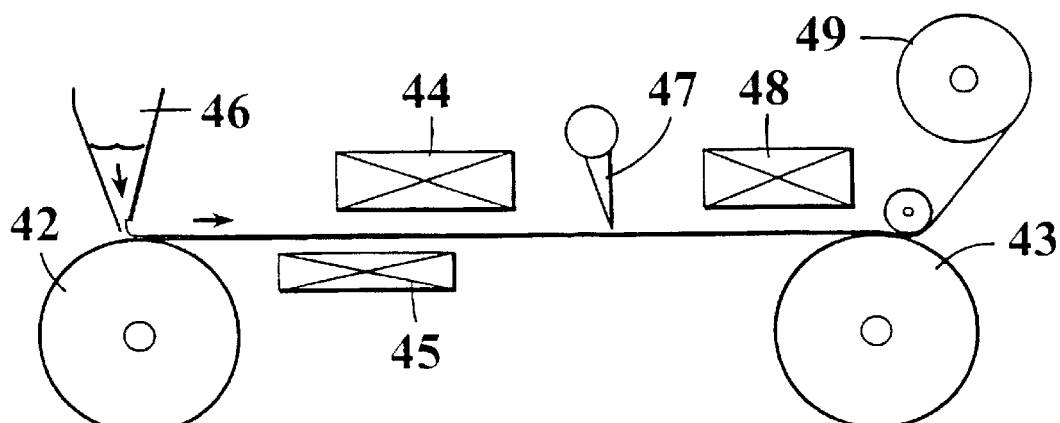
FIG. 3 is a diagrammatic representation of a third embodiment of the invention operable for coating extruded polymer films.

In the embodiments shown in FIGS. 2 and 3, steel belts 21 and 41, respectively, are used as smooth surface for packing and drying a coating layer. The steel belts are supported on rolls (22, 23; 42, 43). In both embodiments, there are heating means (24, 25; 44, 45) arranged on opposite sides of the steel belt. The coating layer is fed via feed hopper 26 and 46, respectively, on the steel belt and heated and dried with said heating means.

The embodiment of FIG. 2 is particularly suited to coating of paper and board web which are fed via a gluing nip formed by two rolls 27 and 28, the latter roll being used for applying a layer of a melt glue on the side of the web facing the coating layer on the steel belt. The gluing unit comprises a glue container, preferably an open tank 29 and a feed roll 30, which contacts with the gluing roll 28. The web is brought into contact with the dried coating layer on the steel belt in a cooling unit 31 in which the web is pressed against a flat cooling surface by a roll 32. Due to the cooling of the belt and the adhesion provided by the glue, the web will lift the coating layer off the belt and it can be wound upon a storage roll 33.

The embodiment shown in FIG. 3 is suited to coating of polymer films. Thus, a thermoplastic polymer is extruded onto the hot coating layer on the steel belt as indicated by reference numeral 47. The coating will melt into the surface of the extruded film which will then be cooled in a cooling unit 48 and separated from the steel belt. The coated polymer film can be wound upon a storage reel 49.

Figure 4:
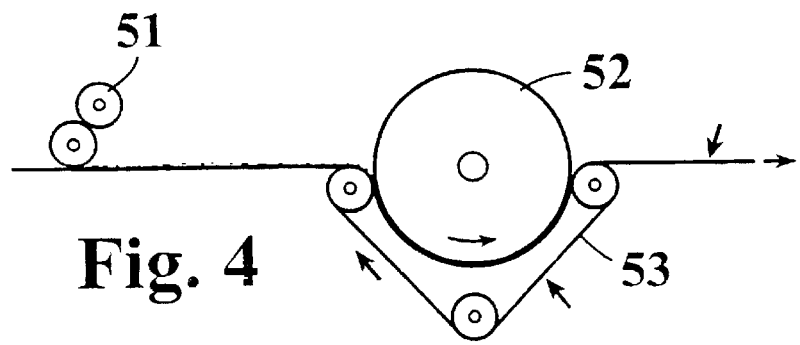
FIG. 4 is a diagrammatic representation of a fourth embodiment of the invention operable for coating paper and board webs using a polished heating cylinder.
Figure 5:
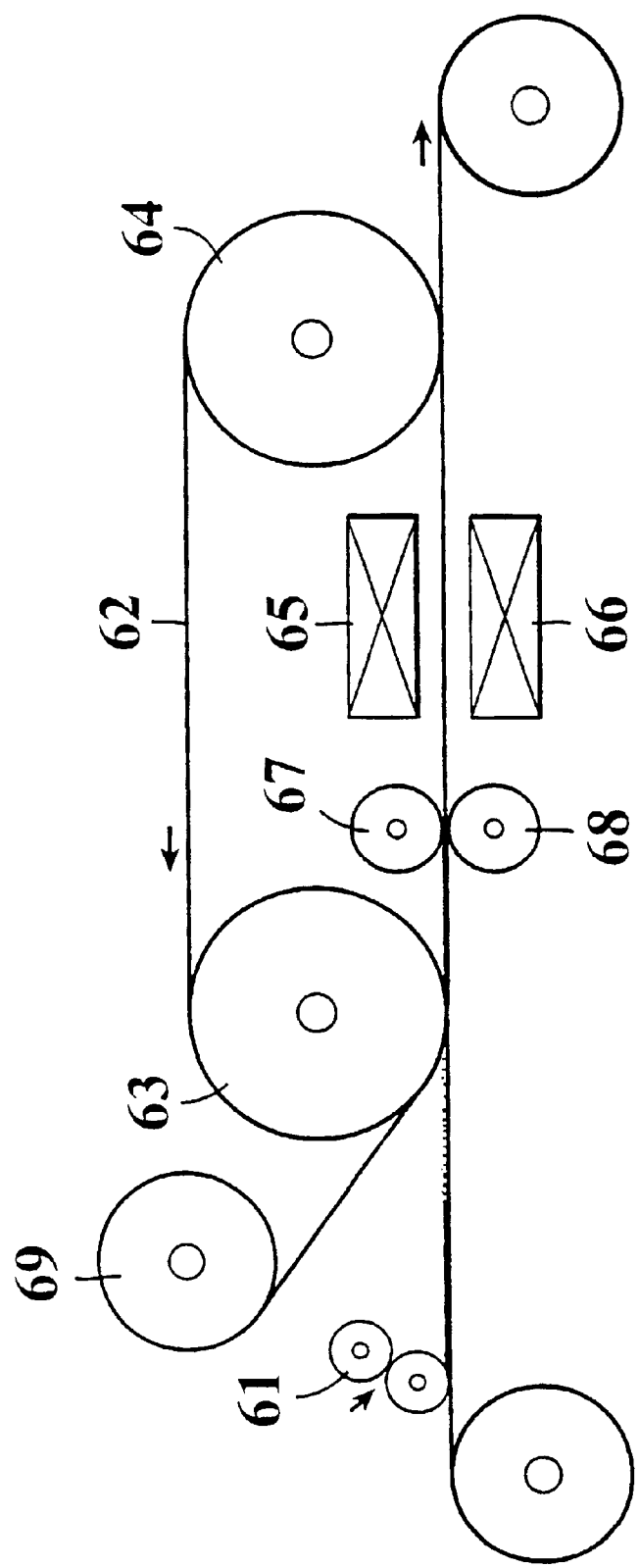
FIG. 5 is a diagrammatic representation of a fifth embodiment of the invention operable for coating paper and board webs using a steel belt for obtaining a smooth surface on the coating layer.

FIGS. 4 and 5 depict a procedure by which the coating layer is cast directly on the paper or board web. The moist slurry containing mineral pigments is applied on the web by using, e.g. press rolls 51; 61 and the coating layer on the web is immediately pressed against a smooth cylinder (52) or belt (62). In the embodiment of FIG. 4, the coating layer is pressed against said polished cylinder 52, which is heated, by using a pushing belt assembly 53 to compress the coating and to promote draining of the water from the coating layer via the porous web. After drying the layer will separate from the polished surface.

In FIG. 5 the polished, heated cylinder and the pushing belt is replaced with a steel belt 62 supported by two rolls 63, 64 and provided with separate heating units 65, 66 and a set of press rolls 67, 68. The embodiment of FIG. 5 is further provided with an arrangement 69 for optionally feeding a polymer film on top of the coated web to produce a laminate. If the coating layer is water-soluble, this will provide for efficient separation of the polymer film from the paper or board which will greatly facilitate repulping of recycled laminate.

Although theoretically the best results are obtained in the absence of any binder, in many actual embodiments, some binder may have to be used in the aqueous coating slurry. However, it is preferred to use only water-soluble substances, which can be monomeric or polymeric. By using water-soluble components it is possible to prevent cracking of the coating caused by the evaporation of the water. The coating will become flexible rather than brittle.

Water soluble inorganic materials, such as water-glass, can also be used, and they have the advantage that with some pigments, e.g. PCC, they can form chemically new reaction products, such as calcium silicates, which will fill the cavities between the particles. In this way it is possible to reach the wanted conditions of Knudsen diffusion and also partially or totally the surface diffusion. This phenomena starts to be important when the molecule size/pore size relation is less than 0.2. This means that with the oxygen molecule, the pore size should be about 1.4 nm.

Examples of water-soluble polymeric binding agents are poly(vinyl alcohol), poly(ethylene imide), CMC, poly(acryl amide) or similar polymers which exhibit heat tolerance up to 110–120° C., at least for short drying periods.

The polymeric binding agent can also be inorganic. One of the best binding agent and at the same time is $SiO_2$-grid, produced with well known sol-gel method by hydrolysing ROSi compounds, like tetraethylsilicate or by other name tetraethoxysilicate, which is hydrolysed on the pigment layer later on or which is used as mixed within that water, what will carry on the pigment layer on the surface forming. Because tetraethylsilicate and other similar product are expensive, this method will save resources if compared with, for instance, the process of U.S. Pat. No. 5,510,147.

The binding aid and or pore filling material can also be very preferable new type of ethylene acrylic acid copolymer, where the Uparticle-size is only ⅓–¼ of that what normal latex biding material normally will exhibit (Tecseal by Trueb Emulsion Chemie AG or Epotal from BASF). The invention can be utilized also by treating the surface after drying with a film forming polymer and drying it again; the original dense packing will stay and the new film forming surface will close pores and prevent dusting and it impairs rubbing resistance to the surface.

The mineral layer can be cast also on a wet or almost wet layer of suitable polymer on the belt which will after the drying separate the whole structure from the polished belt material. Alginates and other cyclic water-soluble polymers can be mentioned as examples of suitable fluid-formed polymers, because the heavy shrinking at last drying stage will release them from the non-shrinking surface.

This pigment barrier technology can be also be carried out at ways, where the polymer is applied onto the surface of heated belt and aqueous pigment dispersion is supplied later on and evaporated so that the binding polymer is beneath, where the pigment partially will sunk.

Because all these pigments which are dispersed into water are more or less hydrophilic and for this reason they will pack closely together when water evaporates from the surface.

In order to achieve the most dense packing density, must the Z-potential of these particles on formed surface be as low as possible. On the other hand, if the Z-potential on suspension, before the evaporation will happen is not the lowest possible, but becomes to optimum value during water evaporation, we can achieve the most dense packing. This is because before the final packing settling to the immobilized positions, it is preferable to keep the particles separated with propulsion forces. This all can be achieve with evaporable acid and /or base system, where the pH moves towards the optimum always during the water escape period. The acid or base can be used by way of a buffering agent for the water-soluble binder. Thus, according to a preferred embodiment, the pH of the water particle slurry used for casting the coating layer is determined by the minimum Z-potential value obtainable for the pigments used. The buffering of the aqueous phase is carried out by using volatile acid and/or volatile basic compounds (mineral acids, organic acids, inorganic or organic bases) which are added in an amount sufficient for adjusting the pH of the aqueous phase to said minimum Z-potential during evaporation of water.

The separation of the barrier layer from the drying belt can be executed in many different ways, as discussed above. A particularly preferred way is to cool the belt from the opposite side soon to lower the temperature.

The coated surface, which is originally formed against very smooth surface from which it is separated and released, is much smoother than freely formed coating surface. Typically, the roughness of the surface is about 0.5 to 5 μm, preferably about 1 to 3 μm, and it exhibits a transmission rate of water vapour of less than 5 g/m2/day.

This smooth surface of the web makes it suitable for a second and/or third coating. The second coating can for example comprise a sealing polymer, another barrier film with pigments or without. It can also be a $SiO_2$ layer deposited by known methods or a metallic layer. In all these cases, the second layer is cheaper and easier to produce than traditionally produced layers.

The pigments used for coating are usually selected from silica, calcium carbonate clay, talc, mica, titanium dioxide, natural and synthetic silicates, aluminium oxide, precipitated silicic acid, polymerized $SiO_2$ networks made by sol-gel or equivalent technology on the surface of the web, and other inorganic fine particles. Also synthetic pigments may be used.

Preferably the pigments have a particle size distribution comprising 60% particles with a size of less than 1 micron. Another preferred embodiment comprises using pigments having a bimodal particle size distribution, wherein the fine particles mainly fill the cavities between the large particles. To achieve the same goal it is of course possible also to use two or more different pigments having different particle sizes.

The coating mixtures can contain conventional additives and adjuvants, such as dispersing agents (e.g. sodium salt of poly(acrylic acid)), substances for adjusting the viscosity and water rentention of the mixture (e.g. CMC, hydroxyethyl cellulose, polyacrylates, alginates, benzoate), lubricating agents, hardeners for improving the water resistance, optical agents, anti-foaming agents and substances for regulating the pH and for preventing product degradation.

EXAMPLE 1

A mixture of water, PCC. $SiO_2$, wherein the $SiO_2$ particles had a diameter 1/10 of the diameter of the PCC particles, was cast at 55% dry substance on a paper web in an amount (dry matter) of 14 g/m². The coated web was then pressed against the PET surface of a steel belt, heated to 120° C. and dried for 10 min. The coated web was then released after slight cooling from the PET surface and the formed pigment layer separated completely from the PET surface.

EXAMPLE 2

As Example 1 but the pigment layer was cast directly on the PET surface of a steel belt, dried at a temperature of 120° C. and transferred to a paper substrate with poly(ethylene imide) glue compound. It was separated after 10 min heating and 30 seconds cooling from the carrier belt.

EXAMPLE 3

As Example 2 but the pigment layer was cast on a highly polished stainless steel belt. whereas the pretreatment comprised a very thin layer of gelatin, dried, cooled the belt from other side and transferred to the paper substrate.

What is claimed is:

1. A process for coating a web, according to which process a coating layer comprising pigment particles is applied to the surface of the web, characterized in that the coating layer is formed from an aqueous pigment slurry that comprises an at least partially hydrophilic pigment, the pH of the aqueous phase at a water content of less than 50% being ±10% of the value which gives the lowest Zeta potential to the slurry, the coating layer is contacted at a preselected stage with a smooth surface, the coating layer is at least partially dried while being contacted with said surface to provide a smooth outer surface of the layer with densely packed particles, and the coating layer is separated from the smooth surface.

2. The process according to claim 1, wherein the coating layer is separately contacted with the smooth surface, dried and then attached to the web.

3. The process according to claim 2, wherein the coating layer is transferred from the smooth drying surface to the web by means of a polymer.

4. The process according to claim 3, wherein the polymer is applied to the coating layer in fluid state and is then allowed to cool before it is used for picking up the coating layer.

5. The process according to claim 1, wherein the coating layer is first applied to the surface of the web and then contacted with said smooth surface and dried.

6. The process according to claim 3, wherein the polymer is selected from the group comprising poly(vinyl alcohol), poly(ethylene imide), CMC or poly(acryl amide), alkali metal silicates and other similar polymers and inorganic materials exhibiting adhesive forces toward both the coating layer and the web.

7. The process according to claim 1, wherein the coating layer is applied to a polymer film surface to form a pigment layer on said surface, the layer is dried, and the polymer film is heated so as to achieve an at least partial melting of the layer on the surface of the film.

8. The process according to claim 1, wherein the smooth drying surface is a heated web, belt or roller.

9. The process according to claim 8, wherein the smooth drying surface is a polymeric drying device.

10. The process according to claim 1, wherein the roughness of the smooth surface is 0.01 to 10 $\mu$m, preferably about 0.1 to 1 $\mu$m.

11. The process according to claim 1, wherein the coating layer is subjected to drying at a temperature in the range of 150 to 300° C., preferably about 180 to 250° C.

12. The process according to claim 1, wherein the coating layer is used as a barrier forming layer.

13. The method according to claim 1, wherein a water soluble polymer binder is used in the aqueous pigment slurry in an amount of 0.5 to 100% of a theoretical void volume between the densely packed particles.

14. The method according to claim 1, wherein the coating layer comprises precipitated calcium carbonate, fine silica ($SiO_2$) powder or any fine mineral powder, having a particle size distribution comprising 60% particles with a size of less than 1 micron.

15. The method according to claim 1, wherein the aqueous pigment slurry has a bimodal particle size distribution and wherein fine particles mainly fill the cavities between large particles.

16. The method according to claim 1, wherein the aqueous pigment slurry has an aqueous phase that comprises water glass which at least partially fills cavities between pigment particles.

17. The method according to claim 16, wherein the aqueous phase comprises buffered water glass.

18. The method according to claim 17, wherein the aqueous pigment slurry has a pH that is determined by the minimum Z-potential value obtainable for pigments used and the buffering of the aqueous phase is carried out by using volatile acid and/or volatile base compounds which are added in an amount sufficient for adjusting the pH of the aqueous phase to said minimum Z-potential during evaporation of water.

19. The method according to claim 1, wherein the coating is further coated from the smooth side with an additional coating selected from the group comprising pigment coating, polymer coating, metallic coating, wax coatings and low polymer weight or monomer material coating, which can be polymerized by activation with heat, ultraviolet light or electron beam, or by a combination of two or more of these coatings or by hydrolyzing silicone alkoxy compounds.

20. The method according to claim 1, wherein the coating comprises organic silicon compounds for obtaining a mat surface and for promoting complete removal of the coating layer from the smooth surface.

21. The method according to claim 1, wherein the coating layer is coated with a further counting layer.

22. The method according to claim 1, wherein the web is selected from the group of paper webs, board webs, polymer films, polymer fiber webs and combinations of two or more of the foregoing webs.

23. The method according to claim 22, wherein the web is pretreated with cationic polymers.

24. The method according to claim 1, wherein the coating layer is vibrated during forming in order to pack pigments more tightly and to remove water from the layer.

25. The method according to claim 1, wherein the coating layer is attached to the web by using an adhesive tie layer between the coating layer and the web.

* * * * *